Sept. 3, 1968    G. ALFIERI ETAL    3,399,932
COMMUTABLE SHUTOFF VALVE WITH BALANCED SURFACES FOR PNEUMATIC
APPARATUS, PARTICULARLY BRAKING SYSTEMS
Filed July 12, 1965    3 Sheets-Sheet 1

INVENTORS
Giuseppe Alfieri
Roberto Moriondo
BY
Stevens, Davis, Miller & Mosher
Attorneys

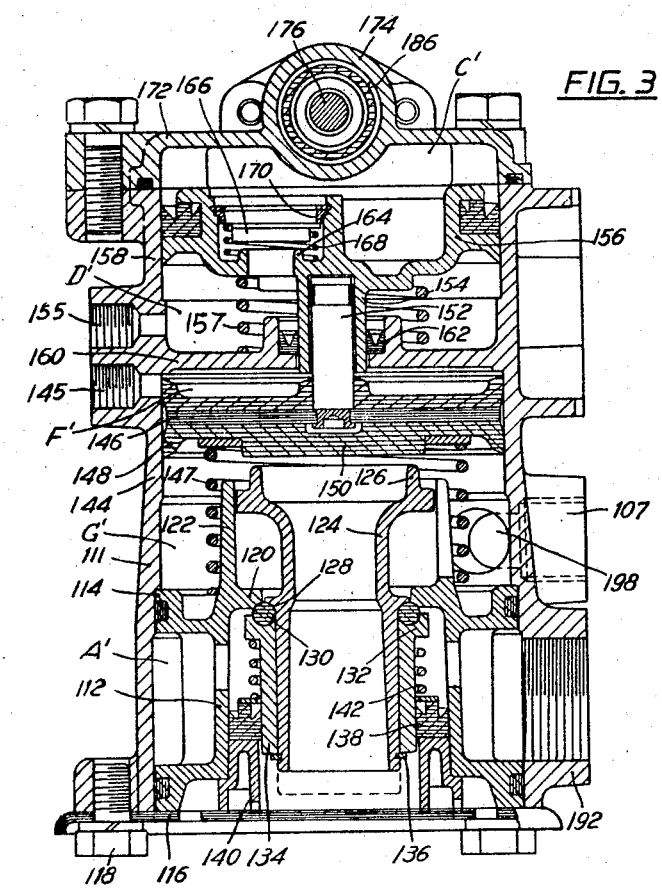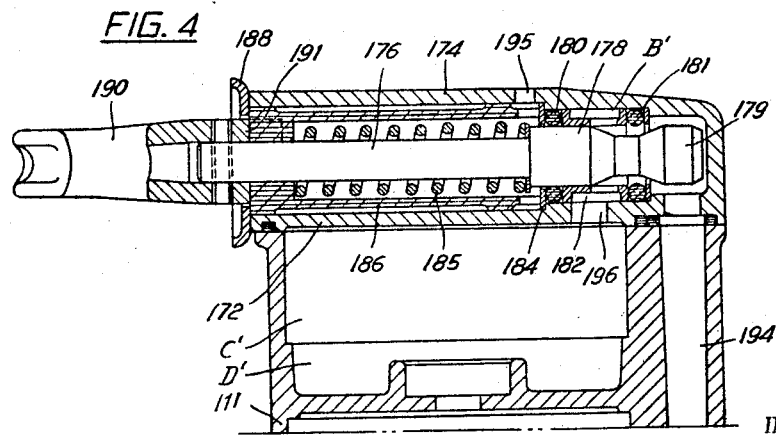

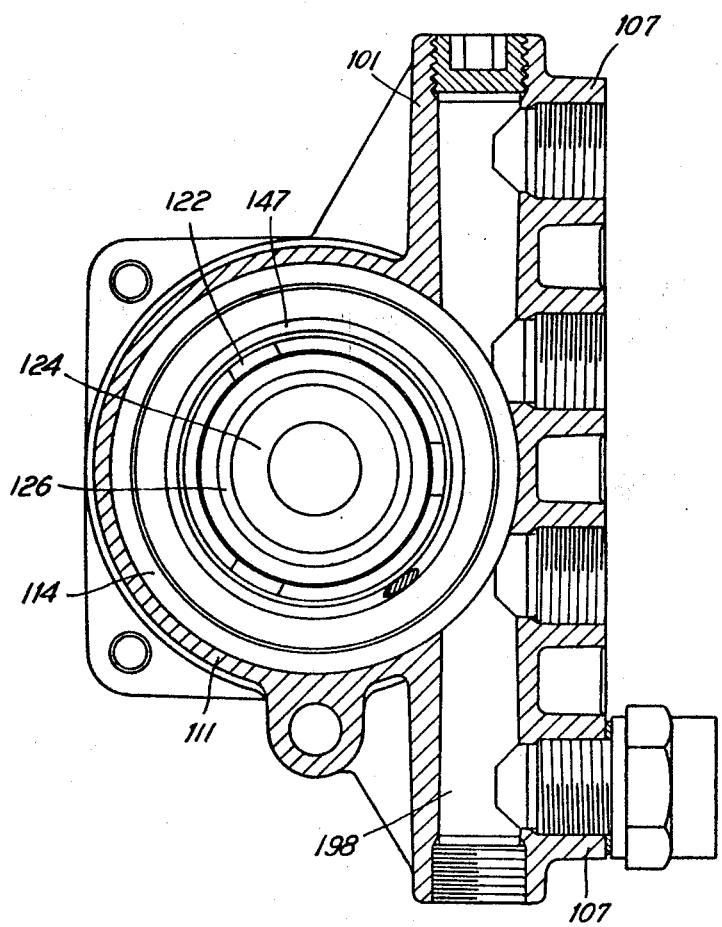

United States Patent Office 3,399,932
Patented Sept. 3, 1968

3,399,932
COMMUTABLE SHUTOFF VALVE WITH BALANCED SURFACES FOR PNEUMATIC APPARATUS, PARTICULARLY BRAKING SYSTEMS
Giuseppe Alfieri and Roberto Moriondo, Milan, Italy, assignors to Fabbrica Italiana Magneti Marelli S.p.A., Milan, Italy, a corporation of Italy
Filed July 12, 1965, Ser. No. 471,138
Claims priority, application Italy, July 15, 1964, 15,419/64; Mar. 3, 1965, 6,374/65
13 Claims. (Cl. 303—54)

ABSTRACT OF THE DISCLOSURE

A distributor for pneumatic braking systems including a first chamber connected to the braking unit, a second chamber connected to a pneumatic source and a piston actuated movable pipe member for selectively connecting the chambers together and the first chamber to an atmospheric exhaust.

---

This invention is complementary to application No. 321,587 of Nov. 5, 1963, now abandoned, and whilst it adheres to the inventive principles of the above application, it concerns an advantageous embodiment of the balanced shut off valves which are applicable, particularly in vehicle braking systems, such as, for example, distributors. Specifically, the purpose of this invention is that of embodying a balanced valve of the specified type, the assembly and maintenance of which are facilitated and the operation of which is insured under every aspect, even in the worst operating conditions, which may occur, whilst the seal is insured by gaskets of suitable material which may do away with the need to face or secure by adhesives the gaskets to the metal parts of the valve itself.

The valve as per this invention embodies a movable pipe member which is axially urged by spring means and provided with two sealing surfaces engageable with complementary surfaces one of which is represented by the body of the valve and the other by the means actuating the pipe member, the valve being characterized by a flange and counterflange on the periphery of the pipe member to hold a sealing gasket in resilient co-action condition; by a second flange secured to the valve body and in the opening of which is inserted the said pipe member, and whose edge cooperates with said sealing gasket; through a crown secured to one of the pipe member ends and which cooperates in sealing relation with the pipe member actuating means, said sealing gasket having an annular contact surface substantially of the same diameter as the sealing surface represented by the crown of said pipe member.

The invention also concerns a distributor and a servo-auto-distributor provided with the balanced valves as above described.

The invention will be made clear by the following description taken in conjunction with the attached drawings which illustrate, by way of example only some embodiments of the balanced valve forming the object of this invention.

Figure 1:
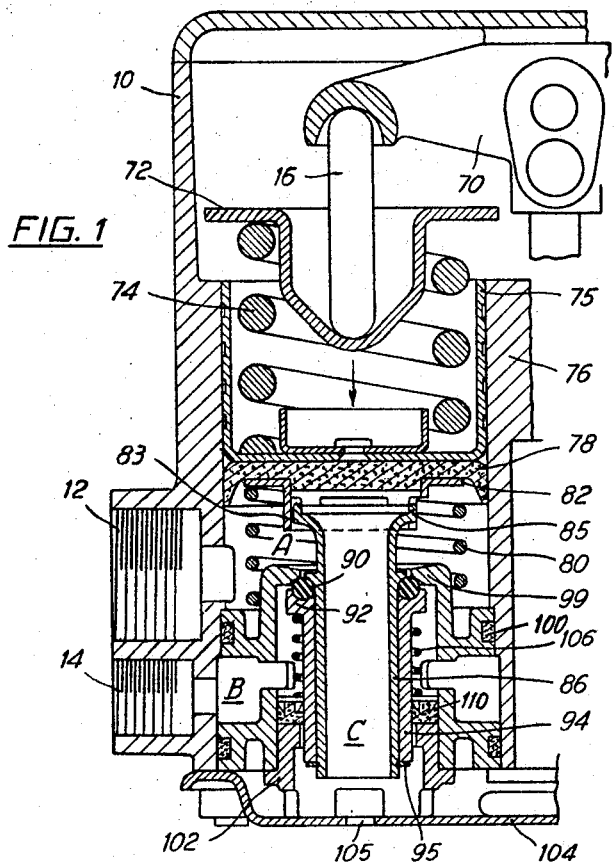
Figure 2:
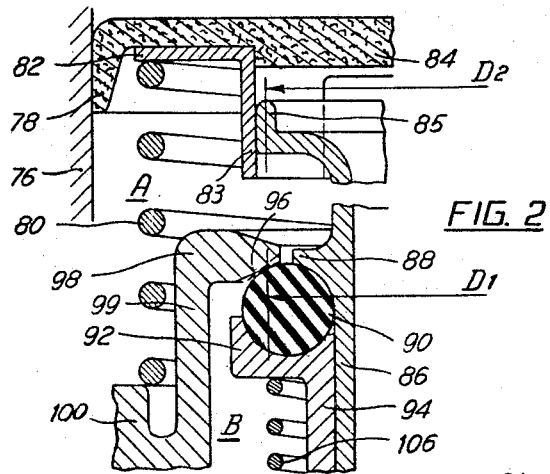

In the drawings:
FIGURE 1 is an axial cross-sectional view of a part of a pneumatic distributor suitable for braking systems of vehicles, provided with the balanced valve of this invention.
FIGURE 2 illustrates, in cross section, and enlarged scale, a detail of said balanced valve.
FIGURE 3 is an axial cross section of a servo-auto-distributor provided with a balanced valve as per this invention.
FIGURE 4 is a partial section taken on a plane perpendicular to FIGURE 3.

FIGURE 5 is a horizontal cross section of FIGURE 3.
Considering FIGURES 1 and 2, a rocker 70 is connected in the known manner with the operating element of the distributor, and each of its ends is pivotally connected through a rod 16 with a bottom plate 72 whose edge is turned over to hold one of the ends of a helical spring 74. The other end of said spring 74 is held by the bottom of a hollow piston 75 slidably located in a cylinder 76, represented by the housing 10 of the distributor. A gasket disk 78 is urged to abut against the bottom of the piston 75 by the action of spring 80, which engages said gasket by means of a backing plate 82. This latter plate has, in its central part, a split flange 83. A lug 84, represented by the central part of packing disk 78, engages resiliently the upper opening of this flange.

A crown 85 slides in the opening of the split flange 83 the peripheral edge of which forms a sealing seat which cooperates with the surface of the lug 84 of disk 78 to form one of the shut off elements of the valve. Crown 85 is secured to one of the ends of a pipe member 86, arranged coaxially with respect to the piston 75, and which, close to its horizontal mid section, has a flange 88, one of the faces of which is depressed to form a concave seat adapted to receive a sealing gasket 90. This gasket consists of a toroidal ring of suitable elastic material. The gasket 90 is secured to the pipe member 86 by a counterflange 92 at one end of a bushing 94 which is inserted over the pipe member and secured with position by a split ring 95 lodged in a keyway on the other end of the pipe member. Gasket 90 is secured so that it will be held between the flange 88 and counterflange 92 with a certain degree of compression and with about three-fourths of the periphery of the toroidal gasket 90 surrounded by said flanges. Specifically, flange 88 and counterflange 92 have seat recesses, the widths of which are approximately 90° and 180°. The free annular surface represents a sealing surface, which engages with an annular tapered surface 96 located opposite the edge of an inner flange 98 carried by the end of a sleeve 99 having sealing crowns 100 co-operating with the inner walls of the previously mentioned housing 10.

The contact diameter D1 of the toroidal ring gasket 90 with surface 96 is substantially equal to the medium diameter D2 of crown 85 so that these two parts have equal surfaces to thus balance the valve according to the pressures which are executed on its faces. A ring 102 is inserted into the lower opening of sleeve 99 and holds a sealing gasket 110 for bushing 94 blocking the same within a seat in housing 10; said ring is secured in position by a cover 104 provided with holes 105 which establish communication between the internal part of housing 10 and the atmosphere. A spring 106 is inserted in the bushing 94 pipe member 86 assembly and its action urges gasket 90 against seat 96 in flange 98. The parts just considered define in housing 10 a first chamber A formed between the bottom of piston 75 (disk 78) and flange 98; said chamber is communicant through fitting 12 with the utility which is represented, in the case under consideration, by the brake actuating motors. A second chamber B is formed by the sealing crowns 100 and communicates by a fitting 14 with the compressed air supply source; a third chamber C is formed by the hole in pipe member 86 and by cover 104 and communicates permanently with the atmosphere through holes 105 in said cover.

The operation of the balanced valves is as follows: considering the parts of the valve in the position shown in the drawing, chamber A communicates with the atmosphere through the opening in the split flange 83 the hole in pipe member 86 and chamber C. By actuating rocker 70 the piston 75 shifts in the direction of the arrow shown in FIGURE 1 and engages the lug 84 with the crown 85 to shut off the communication between chambers A and C so that the fluid under pressure may flow between chambers B and A.

As stated infra, in the balanced valve described and illustrated, the sealing seats between the ports of the different chambers, A, B, C are all substantially located on the same axis. During machining and assembly this condition may be achieved easily in that, as illustrated in FIGURE 2, the contact diameter D1 may be varied within certain limits and therefore, the sealing surface between chambers A and B, by varying the angle of the taper 96 on crown 98 thereby varying the tangent annular surface of ring 90.

Other modifications and variants may be introduced in the invention, for obtaining the desired operating conditions depending upon the application requirements of the balanced valve.

The solution described and illustrated makes it possible to avoid securing the sealing gaskets to the metal parts and which, especially in the case of rubber gaskets, could require vulcanizing, in order to be perfect and undetachable. On the other hand, it is possible to replace the gaskets quickly when necessary, without need of replacing also metal parts of the balanced valve with reference to FIGURES 3 and 5, the servo-auto distributor illustrated embodies a housing 111 which has in its inner part, a sleeve 112 which is secured and held in sealed tight relationships against a shoulder 114 by a cover 116 by means of screws 118. The sleeve 112 has on its inner part a flange 120 and above the latter a split crown 122 which form a guiding element for a pipe member 124 which represents the moving element of the valve of this invention. The pipe member has, at its upper end, a crown 126 (representing one of the two sealing surfaces of said movable element) and near to said crown, a flange 128 one of whose faces is recessed to receive the annular gasket (ring gasket) 130, which is torodial in the case illustrated. The gasket 130 is held and secured conveniently by a flange 132 embodying a bushing 134 inserted about the lower end of pipe member 124 and secured thereby a split ring 136 which partially engages a peripheral groove around the edge of said pipe member 124. A sealing gasket 138 is located between the bushing 134 and the inner wall of the sleeve 112 to further guide the pipe member 124, and is held by means of a ring 140 by the bottom cover 116, previously considered; moreover, the gasket 138 carries one of the ends of a helical spring 142 the other end of which engages flange 132 thus urging the toroidal gasket 130 against the sealing seat 120.

The housing 111 of the servo-auto distributor has, toward its upper part, a first cylinder 144 for a relevant piston 146 provided with sealing gaskets, one of which consists of a disk 148 with flexible edges and which has, in its central part, a circular backing plate 150 suitable to cooperate with the previously mentioned crown 126 and which represents the movable sealing seat of the valve of this invention. The disk 148 is held in engagement with the piston 146 by the action of a spring 147 the other end of said spring being held by the sleeve 112.

A stem 152 is secured to the piston 146 which slides into engagement with the bottom of a blind hole carried, axially, by a second stem 154 secured to a second piston 156 which is co-axial with piston 146 and which moves in a relevant cylinder 158 which is an extension of cylinder 144. These cylinders 144 and 158 are separated from each other by a wall 160 which has, in its central part, an opening suitable for housing a gasket 162 which cooperates with the stem 154.

The piston 156 is provided with an opening, the upper edge of which forms a sealing seat 164 for a valve 166 urged by a spring 168, the action of which moves said valve away from its seat, causing it to engage with an annular stop 170 in a groove in the body of piston 156 so as to keep valve 166 slightly detached from its seat 164. The cylinder 158 is closed by a cover 172 which has a drilled lug 174 in its middle portion and which houses a manually actuated shut off device consisting of a rod 176 one of the ends of which is provided with two coaxial pistons 178 and 179 separated by a peripheral groove.

Said two pistons cooperate alternately with respective sealing diaphragms 180 and 181 located inside the drilled lug 174 and secured thereto by a split segment 184 through a suitable spacer 182.

A spring 185 is inserted on rod 176 so as to urge the double piston 178–179 from left to right (FIGURE 4) and is secured at its other end by a bushing 186 inserted in the hole of lug 174 and held therein by a cover 188.

The protruding end of rod 176 carries an actuating handle 190 or remote control transmission elements comprising, for example, tie rods, Bowden cables or similar devices connected to a control lever. The hub of this handle has, in a convenient position, a lug 191 which fits into a relevant seat in the cover 188 and which may be disengaged from said seat to position, axially, the double piston 178 and 179.

The parts described in connection with the servo-auto-distributor give use to a plurality of chambers pneumatically connected to each other and to the trailer braking system. Specifically, the annular chamber A′, formed inside housing 111 by sleeve 112 communicates, through a fitting 192 with a compressed air tank located on the trailer, in turn connected, in the known manner, with the compressed air supply source through the automatic braking system conduit. Chamber A′ is also connected, through a conduit 194 (see FIGURE 4) with an annular chamber B′ formed by the gaskets 180–181 inside the drilled lug 174 when the double piston 178–179 is in the position shown in FIGURE 4.

On the other hand, when the double piston is shifted toward the left, chamber B′ is made communicant with the atmosphere through a vent hole 195 located in a suitable position in lug 174; moreover, said chamber B′ is constantly in communication with chamber C′ pertaining to the cylinder-piston assembly 156–158, through a vent hole 196 in cover 172.

Chamber C′ is connected with a further chamber D′ in the cylinder-piston assembly 156–158 through a retaining valve 166, said chamber D′ being communicant through fitting 155 which receives the conduit for automatic braking in relation to what will be described hereinafter.

The upper chamber F′ of piston cylinder assembly 144–146 is connected, by fitting 145 with the adjustable braking conduit, which is, in turn, connected to the braking system distributor; the underlying chamber G′, on the other hand, is permanently connected with a rectilinear chamber 198 which forms a manifold and which hold axially, a cross piece 101 (see FIGURE 5) secured to the housing 110 and arranged perpendicularly in respect to the latter; said cross-piece has, along one of its generating lines, fittings 107 which receive the pipes leading to the brake actuating devices.

Chamber G′ communicates with the atmosphere through the opening in pipe member 124 and the holes in bottom cover piece 116, when the bottom plate 150 is disengaged from crown 126, and with chamber A′ through the slits in guide crown 122 when the gasket 130 is moved away from flange 120.

The operation of the servo-auto-distributor described infra is evident. When the brake actuating devices are in their normal idle position, the pressure prevailing in the automatic braking conduit and which is connected to fitting 155 is delivered to chamber D′ and, through the holding valve 166, (when open) passes into chamber C′ and the piston 156 is held in the lifted position only by the action of spring 157. Said pressure in chamber C′, passes through hole 196, chamber B′ conduit 194, chamber A′ and fitting 192 into the trailer tank, since the double piston 178–179 is in the position shown in FIGURE 4, to establish communication between chamber B′ and conduit 194.

Under these conditions, if the distributor installed on the motor vehicle is actuated, in the modulating braking conduit connected to fitting 145, air flow is delivered into chamber F' which displaces piston 146 in opposition to the action of spring 147. The circular bottom plate 150 engages with the crown 126 of pipe member 124 to shut off the communication between chamber G' and the atmosphere; on the other hand, the gasket 130 is disengaged from flange 120 to establish a communication between said chamber G' and chamber A'. Furthermore, the compressed air from the trailer tank is delivered, through fittings 107 to the braking devices, so that the latter may be actuated. When the control action on the distributor ceases, the adjustable braking pipe and consequently also chamber F' are made communicant with the atmosphere and spring 147 causes piston 146 to return to its lifted position, to shut off, on the one hand, a communication between chambers A' and G' and on the other, to establish communication of chamber G' with the atmosphere.

During emergency braking (which is effected by discharging the pressure in the automatic braking pipe), the pressure prevailing in chamber B' is annulled and piston 156 is therefore subjected only to the action of the pressure prevailing in chamber C', which is supplied by the pressure in the trailer tank. As soon as the pressure in chamber D' drops, the prevailing pressure in chamber C' closes the retaining valve 166 and acts on piston 156, displacing the latter in opposition to the action of spring 157.

The displacement of this piston, through stem 154, also causes piston 146 to shift establishing thereby the pneumatic connection previously considered, and resulting operation of the trailer brakes.

When the trailer is separated from the motor vehicle, with consequent interruption of the automatic braking conduit, the conditions just considered are repeated and the trailer brakes are actuated automatically. To release the brakes of the trailer when separated from the motor vehicle, the handle 190 is actuated to shift axially the rod 176 with its double piston 179–178, in opposition to the action of spring 185. The piston 179 engages with the gasket 181 to interrupt the communication between the trailer tank and chamber B', whilst the latter, is connected to the atmosphere, through the slot in the double piston and hole 195.

Meanwhile, equal pressures are established in chambers C' and D' and piston 156, is returned to its initial position, together with piston 146, through the action of springs 157 and 147, respectively. The pipe member 124 is also returned to its initial position, thereby interrupting the communication between chambers A' and G', while the latter chamber is connected with the atmosphere to render the trailer braking devices inoperative.

The double piston 178–179 may be maintained permanently in the position last considered by disengaging lug 191 from its seat in cover 188, whilst engaging it with the external surface of the latter.

In view of the above description, taken in conjunction with the drawings, the advantages obtainable with the servo-auto distributor should be evident to all those skilled in the art.

The horizontal arrangement of the fittings 107 for the brake actuating means, makes it possible to obtain wide ports for allowing air to pass, without requiring an increase in dimensions and especially the height of the servo-auto-distributor.

The increased power of the servo-auto-distributor, or the ratio between the effective active areas of piston 146–148 is achieved by suitably sizing the diameter of crown 126 in pipe member 124.

The area formed by said crown is substantially equal to the area formed by flange 120 in sleeve 112 and which represents a fixed seat for the valve shutting off communication between chambers A' and G'.

It is understood that modifications and changes may be introduced in the balanced valve, the distributor and servo-auto-distributor hereinabove described, for the purpose of meeting with the application and usage requirements, without departing from the scope of this invention.

We claim:
1. A distributor device for pneumatic systems comprising a casing having an inlet adapted to be connected to a source of fluid pressure and having an outlet adapted to be connected to an apparatus to be served by said device, a first passageway within said casing connecting said inlet with said outlet, a second passageway within said casing connecting said outlet with the atmosphere, a pipe member movably mounted within said casing, a first sealing means associated with said pipe member for blocking said first passageway when said pipe member is in one position, said second passageway being normally open when said pipe member is in said one position, an actuation means extending into said casing and being slidably mounted for movement axially of said pipe member, a second sealing means associated with said actuation means and said pipe member for blocking said second passageway when said actuation means is moved into contact with said pipe member, said actuation means being movable to press said pipe member to another position wherein said first passageway is opened, a first chamber within said casing forming a part of said first passageway and communicating with said outlet, a second chamber within said casing also forming a part of said first passageway and communicating with said inlet, an opening between said chambers, said pipe member being extended through said opening with said second sealing means being within said first-mentioned chamber, said casing providing an annular sealing seat between said chambers, said first sealing means including a sealing ring which bears against said annular seat on its one side and engages said pipe member on its other side to provide sealing therebetween, said first sealing means and said second sealing means being substantially of the same diameter, retaining means for holding said pipe member within said casing, and a spring between said retaining means and said first sealing means for urging said sealing ring against said annular seat.

2. A distributor device according to claim 1 in which said movable pipe member further comprises a flange, a counter flange carried by the periphery of the pipe member so as to hold said sealing ring therebetween for coaction with said annular sealing seat of said casing and in whose opening said pipe member is inserted and the edge of which engages with said sealing ring; a crown secured to one end of the pipe member, a gasket on said actuating means engaging with said crown, said gasket having an annular contact surface which is substantially of the same diameter as the sealing surface of said crown.

3. A distributor device according to claim 2 in which at least the counter flange is secured to the pipe member to hold the sealing ring against the pipe member itself.

4. A distributor device according to claim 2 in which said sealing ring has at least one half of its peripheral surface secured between the flange and the counter flange.

5. A distributor device according to claim 4 in which the annular sealing seat has on its edge a sealing surface which cooperates with the free surface of the sealing ring.

6. A distributor device according to claim 5 in which the sealing surface of the annular sealing seat has an angle of inclination selected within a given range whereby the effective sealing surface of said seal is determined.

7. A distributor device according to claim 2 further comprising guiding elements for the crown and carried by said actuating means.

8. A distributor device according to claim 2 further comprising guiding elements for said crown and carried by said housing.

9. A distributor device according to claim 2 further comprising first and second spring means between which said second sealing means is located for cooperation with said crown, one of said spring means engaging with said actuating means.

10. A distributor device according to claim 9 in which said actuating means comprises a drive means, a piston inserted between the drive means and the pipe member, said second sealing means being mounted on said piston at the central portion thereof and protruding therefrom to form a sealing seat with which the crown cooperates.

11. A distributor device according to claim 10 further comprising a backing plate provided with a slit flange in which said crown operates, said backing plate being held in engagement with said piston, by said second spring means.

12. A distributor device according to claim 2 in which said annular sealing seat is formed by one end of a sleeve which is provided with sealing crowns, said sleeve being engaged with one of the inner walls of the housing to form said first and second chambers.

13. A distributor device according to claim 12 in which said sleeve has at its lower end a groove for a ring housed in the sleeve and which holds a sealing means which cooperates with the pipe member, a cover secured to the lower end of said housing to hold and secure therein said ring and said sleeve.

References Cited
UNITED STATES PATENTS

| | | | |
|---|---|---|---|
| 2,515,946 | 7/1950 | Cadman | 303—54 X |
| 2,854,289 | 9/1958 | Schnell | 303—54 |

MILTON BUCHLER, *Primary Examiner.*

J. J. McLAUGHLIN, *Assistant Examiner.*